United States Patent Office 2,994,686
Patented Aug. 1, 1961

2,994,686
TRIFLUOROMETHYLSALIGENIN AND SELF-CONDENSATION PRODUCT THEREOF
Murray Hauptschein, Glenside, Pa., assignor to Pennsalt Chemicals Corporation, Philadelphia, Pa., a corporation of Pennsylvania
No Drawing. Filed May 15, 1958, Ser. No. 735,645
2 Claims. (Cl. 260—53)

This invention relates to 4-trifluoromethyl-2-hydroxybenzyl alcohol, a novel compound which is represented by the formula

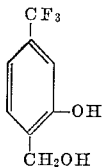

and which may also be termed 4-trifluoromethylsaligenin.

This application is a continuation-in-part of Serial No. 447,390 filed August 2, 1954.

4-trifluoromethyl-2-hydroxybenzyl alcohol is derived from 4-trifluoromethylsalicylic acid, a novel compound disclosed and claimed in the above patent application.

4-trifluoromethyl-2-hydroxybenzyl alcohol is a white crystalline material which has the general attributes of the group of compounds known as "salicylates" or "salicyl" drugs. However, the presence of the trifluoromethyl group in the molecule makes the compound more toxic in bacteriostatic action than the unsubstituted salicylic alcohol, or saligenin. In addition to having inherent germicidal properties, 4-trifluoromethyl-2-hydroxybenzyl alcohol is readily self-condensed to a thermoplastic resin which has valuable applications as a dip or spray waterproofing coating for wood and metal products.

The preparation of 4-trifluoromethyl-2-hydroxybenzyl alcohol is demonstrated by the following example.

Example 1

4-trifluoromethylsalicylic acid (41.2 g.), dissolved in 150 ml. of ethyl ether was added drop by drop to 7.6 g. of lithium aluminum hydride in 200 ml. of anhydrous ethyl ether over a period of 4 hours. The reaction mixture was worked up in the usual manner. 4-trifluoromethyl-2-hydroxybenzyl alcohol (36 g., 94%) was isolated. After recrystallization from benzene, the white solid, which gave a wine-red ferric chloride reaction, melted at 66–66.5° C.

*Analysis.*—Calcd. for $C_8H_7O_2F_3$: C, 50.01; H, 3.67. Found: C, 49.92; H, 3.73.

Self-condensation of 4-trifluoromethyl-2-hydroxybenzyl alcohol, or 4-trifluoromethylsaligenin, to resinous 4-trifluoromethylsaligenin is demonstrated by the following example.

Example 2

4-trifluoromethyl-2-hydroxybenzyl alcohol (1.92 g.), n-perfluorobutyric acid (2.35 g.), and benzene (20 ml.) were refluxed together for 6 hours. Upon washing the reaction mixture with sodium bicarbonate solution, essentially all of the perfluorobutyric acid was recovered as the sodium salt. After all of the benzene was distilled out of the previously dried organic layer, the product was heated under vacuum to 250° C. The residue consisted of about 1 g. of a fluorine-containing resin, M.P. about 85³ C. resulting from the self-condensation of the 4-trifluoromethylsaligenin.

The 4-trifluoromethylsaligenin self-condensation product prepared according to the procedure of Example 2 is particularly useful as a thermoplastic waterproofing agent which is preferably applied to surfaces without use of a solvent or plasticizer. The resin can be melted and then sprayed with a spray-gun onto wood or metal surfaces to render the surfaces impervious to moisture. A bath of the resin can also be prepared into which wood- and metal objects can be dipped to coat them with the 4-trifluoromethylsaligenin resin. The use of the resin in the coating of metal parts for storage is particularly advantageous in that the resin coating can be readily removed from the parts by mechanical stripping or by dipping the parts into a bath of hot oil, or by passing them through an oven heated above the melting and flow points of the resin.

The 4-trifluoromethylsaligenin resin can also be used to waterproof and rotproof wood posts for use in damp ground as demonstrated by the following example.

Example 3

A bath of 4-trifluoromethylsaligenin self-condensation product is heated to about 108–110° C. Kiln-dried yellow pine fence posts are completely immersed in the bath for a period of time at least sufficient for the resin to penetrate and fill the pores of the wood. The posts are then hung vertically to drain, and cooled to set the resin. When the resin is set, a water-impervious sheath of resin remains coating the surface of the wood. The resin-treated post is then inserted in the ground where desired. The above-ground portion of the post can then be painted, or it may be left in its natural state.

The 4-trifluoromethylsaligenin self-condensation product can also be prepared and used in the form of a solution of the resin dissolved in an organic solvent, e.g., benzene, toluene, xylene, and chlorinated hydrocarbons. The resin solution can be brushed onto a wood or metal surface, leaving a film-like coating of 4-trifluoromethylsaligenin resin adhering thereto after the solvent evaporates.

Many different embodiments of this invention may be made without departing from the spirit and scope thereof, and it is to be understood that my invention includes also such embodiments and is not to be limited by the above description.

I claim:
1. The compound 4-trifluoromethyl-2-hydroxybenzyl alcohol.
2. The self-condensation product of 4-trifluoromethylsaligenin formed by the method which comprises heating 4-trifluoromethylsaligenin in the presence of perfluorobutyric acid and a solvent at reflux temperature, removing the acid and solvent and heating the residual product under vacuum to remove water.

References Cited in the file of this patent

Mooradian et al.: J.A.C.S., pp. 3470–72, vol. 73.
Hauptschein et al.: J.A.C.S., pp 4476–7, vol. 76.
Megson: Phenolic Resin Chemistry, pp. 165–177, (Academic Press, 1958).
Ellis: "Chemistry of Synthetic Resins," Rheinhold Pub. Co., N.Y., 1935, vol. 1, p. 287.

UNITED STATES PATENT OFFICE
CERTIFICATE OF CORRECTION

Patent No. 2,994,686                            August 1, 1961

Murray Hauptschein

It is hereby certified that error appears in the above numbered patent requiring correction and that the said Letters Patent should read as corrected below.

Column 2, line 2, for "853 C." read -- 85° C. --.

Signed and sealed this 9th day of January 1962.

(SEAL)
Attest:

ERNEST W. SWIDER
Attesting Officer

DAVID L. LADD
Commissioner of Patents